United States Patent
Bonin et al.

(10) Patent No.: US 11,311,965 B2
(45) Date of Patent: Apr. 26, 2022

(54) METHODS FOR ALIGNING MULTIPLE OPTICAL SURFACES USING SPHERES

(71) Applicant: CORNING INCORPORATED, Corning, NY (US)

(72) Inventors: David Richard Bonin, Pittsford, NY (US); Joshua Monroe Cobb, Victor, NY (US); Brian Monroe McMaster, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 111 days.

(21) Appl. No.: 16/924,758

(22) Filed: Jul. 9, 2020

(65) Prior Publication Data

US 2021/0008659 A1   Jan. 14, 2021

Related U.S. Application Data

(60) Provisional application No. 62/872,448, filed on Jul. 10, 2019.

(51) Int. Cl.
| | |
|---|---|
| *B23K 26/04* | (2014.01) |
| *G01N 21/45* | (2006.01) |
| *G02B 21/00* | (2006.01) |
| *G02B 26/06* | (2006.01) |

(52) U.S. Cl.
CPC .......... *B23K 26/043* (2013.01); *G01N 21/45* (2013.01); *G02B 21/0004* (2013.01); *G02B 26/06* (2013.01)

(58) Field of Classification Search
CPC .................................................. B23K 26/043
USPC ........................................................ 356/508
See application file for complete search history.

(56) References Cited

U.S. PATENT DOCUMENTS

| | | | |
|---|---|---|---|
| 5,541,731 A | 7/1996 | Freedenberg et al. | |
| 5,666,198 A | 9/1997 | Stenton | |
| 5,923,482 A * | 7/1999 | Gilby ........................ | G01J 3/18 |
| | | | 359/846 |
| 6,902,326 B1 * | 6/2005 | Ames ..................... | G02B 6/262 |
| | | | 385/60 |
| 6,924,897 B2 | 8/2005 | Parks et al. | |
| 7,079,259 B1 | 7/2006 | Stenton | |
| (Continued) | | | |

FOREIGN PATENT DOCUMENTS

WO         01/22031 A1    3/2001

OTHER PUBLICATIONS

International Search Report and Written Opinion of the International Searching Authority; PCT/US2020/041176; dated Oct. 27, 2020; 10 Pages; European Patent Office.

*Primary Examiner* — Tarifur R Chowdhury
*Assistant Examiner* — Omar H Nixon (57) ABSTRACT

A method for aligning multiple optical components in an optical system including placing a sphere at a first position that is at a center of curvature of a first optical component, and aligning a focus of a first reference signal with the sphere at the first position. Then, moving the sphere along an axis of optical symmetry to a second position that is at a center of curvature of a second optical component, and aligning a focus of a second reference signal with the sphere at the second position. The first optical component is aligned with the first reference signal and fixing the first optical component, and the second optical component is aligned with the second reference signal and fixing the second optical component.

20 Claims, 8 Drawing Sheets

(56) References Cited

U.S. PATENT DOCUMENTS

| | | | |
|---|---|---|---|
| 7,835,012 B1 * | 11/2010 | Schweiger | G01B 9/02038 356/508 |
| 2005/0206908 A1 * | 9/2005 | Hamed | G01B 11/272 356/508 |
| 2009/0190137 A1 * | 7/2009 | Stenton | G01B 11/2441 356/496 |

* cited by examiner

METHODS FOR ALIGNING MULTIPLE OPTICAL SURFACES USING SPHERES

This application claims the benefit of priority to U.S. Provisional Application Ser. No. 62/872,448 filed on Jul. 10, 2019, the content of which is relied upon and incorporated herein by reference in its entirety.

BACKGROUND

Field

The present specification generally relates to optically aligning multiple surfaces that do not share an axis of rotational symmetry. In particular, the present specification relates to optically aligning multiple surfaces using interferometers and spheres.

Technical Background

Optical systems are generally comprised of components that share a common axis of rotational symmetry. The techniques for assembly of these types of systems are known and include many methods for adjusting or aligning surfaces so that their axes are co-linear with an optical axis.

Known systems may be comprised of components that are off-axis from any optical axis. That is, a physical component (such as, for example, a first mirror) is placed in reference to another component (such as, for example, a second mirror) and the two components never intersect the axis of optical symmetry. In addition, in some systems, the optical axis of the system may not be the axis of rotational symmetry. These systems are challenging to accurately align. One known method to align such systems is to place very tight mechanical tolerances on the mounting mechanism. This can be expensive and the precision is limited to the tolerances of the mechanics. This tolerance can be, for example, on the order of 0.025 mm, which may not be good enough for certain applications.

Therefore, a more accurate method of aligning off-axis surfaces is desired.

SUMMARY

According to an embodiment, a method for aligning multiple optical components in an optical system comprises: placing a sphere at a first position that is at a center of curvature of a first optical component; aligning a focus of a first reference signal with the sphere at the first position; moving the sphere along an axis of optical symmetry to a second position that is at a center of curvature of a second optical component; aligning a focus of a second reference signal with the sphere at the second position; aligning the first optical component with the first reference signal and fixing the first optical component; and aligning the second optical component with the second reference signal and fixing the second optical component.

In first aspect, a method for aligning multiple optical components in an optical system comprising: placing a sphere at a first position that is at a predetermined center of curvature of a first optical component; aligning a focus of a first reference signal with the sphere at the first position; moving the sphere along an axis of optical symmetry to a second position that is at a predetermined center of curvature of a second optical component; aligning a focus of a second reference signal with the sphere at the second position; aligning the first optical component with the first reference signal and fixing the first optical component; and aligning the second optical component with the second reference signal and fixing the second optical component.

A second aspect includes the method of the first aspect, wherein the first reference signal and the second reference signal are selected from lasers of an interferometer and a source of a point source microscope.

A third aspect includes the method of any of the previous aspects, wherein the first reference signal and the second reference signal are lasers of an interferometer.

A fourth aspect includes the method of any of the previous aspects, wherein the first optical component and the second optical component are mirrors.

A fifth aspect includes the method of any of the previous aspects, wherein at least one of the first optical component and the second optical component is not present on a system optical axis.

A sixth aspect includes the method of any of the previous aspects, wherein the first optical component is present on the system optical axis and the second optical component is not present on the system optical axis.

A seventh aspect includes the method of any of the previous aspects, wherein the sphere is made of glass.

An eighth aspect includes the method of any of the previous aspects, wherein the first optical component and the second optical component are fixed by adhering the first optical component and the second optical component with an adhesive.

A ninth aspects includes a method for aligning multiple optical components in an optical system comprising: placing a first sphere at a center of curvature of a first optical component; placing a second sphere at a center of curvature of a second optical component and in physical contact with the first sphere; aligning a focus of a first reference signal to the first sphere; aligning a focus of a second reference signal to the second sphere; aligning the first optical component with the first reference signal and fixing the first optical component; and aligning the second optical component with the second reference signal and fixing the second optical component, wherein a sum of a radius of the first sphere and a radius of the second sphere is equal to a distance between the center of curvature of the first optical component and the center of curvature of the second optical component.

A tenth aspect includes the method of the ninth aspect, wherein the first reference signal and the second reference signal are selected from lasers of an interferometer and a source of a point of source microscope.

An eleventh aspect includes the method of the ninth or tenth aspects, wherein the first reference signal and the second reference signal are lasers of an interferometer.

A twelfth aspect includes the method of the ninth to eleventh aspects, wherein the first optical component and the second optical component are mirrors.

A thirteenth aspect includes the method of the ninth to twelfth aspects, wherein at least one of the first optical component and the second optical component are not present on a system optical axis.

A fourteenth aspect includes the method of the thirteenth aspect, wherein the first optical component is present on the system optical axis and the second optical component is not present on the system optical axis.

A fifteenth aspect includes the method of the ninth to fourteenth aspects, wherein one of the first optical component or the second optical component is a convex mirror.

A sixteenth aspect includes the method of the fifteenth aspect, wherein one of the first optical component or the second optical component is a concave mirror.

A seventeenth aspect includes the method of the ninth to sixteenth aspects, wherein a diameter of the first sphere and a diameter of the second sphere is each equal to the distance between the center of curvature of the first optical component and the center of curvature of the second optical component.

An eighteenth aspect includes the method of the ninth to seventeenth aspects, wherein the first sphere and the second sphere are made of glass.

A nineteenth aspect includes the method of the ninth to eighteenth aspects, wherein the first optical component is present on the system optical axis and the second optical component is not present on the system optical axis.

A twentieth aspect includes the method of the ninth to nineteenth aspects, wherein a geometrical center of the first sphere and a geometrical center point of the second sphere are each present on an optical axis of symmetry.

Additional features and advantages will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of methods for aligning optical surfaces using spheres. In an embodiment, a method for aligning multiple optical components in an optical system comprises: placing a sphere at a first position that is at a desired center of curvature of a first optical component; aligning a focus of a first reference signal with the sphere at the first position; moving the sphere along an axis of optical symmetry to a second position that is at a desired center of curvature of a second optical component; aligning a focus of a second reference signal with the sphere at the second position; aligning the first optical component with the first reference signal and fixing the first optical component; and aligning the second optical component with the second reference signal and fixing the second optical component. In an embodiment, a method for aligning multiple surfaces in an optical system comprises: placing a first sphere at a desired center of curvature of a first component; placing a second sphere at a desired center of curvature of a second optical component and in physical contact with the first sphere; aligning a focus of a first reference signal to the first sphere; aligning a focus of a second reference signal to the second sphere; aligning the first component with the first reference signal and fixing the first component; and aligning the second optical component with the second reference signal and fixing the second optical component, wherein a sum of a radius of the first sphere and a radius of the second sphere is equal to a distance between the center of curvature of the first component and the center of curvature of the second optical component. Various systems and methods for optically aligning multiple surfaces will be described herein with specific reference to the appended drawings.

Figure 1:
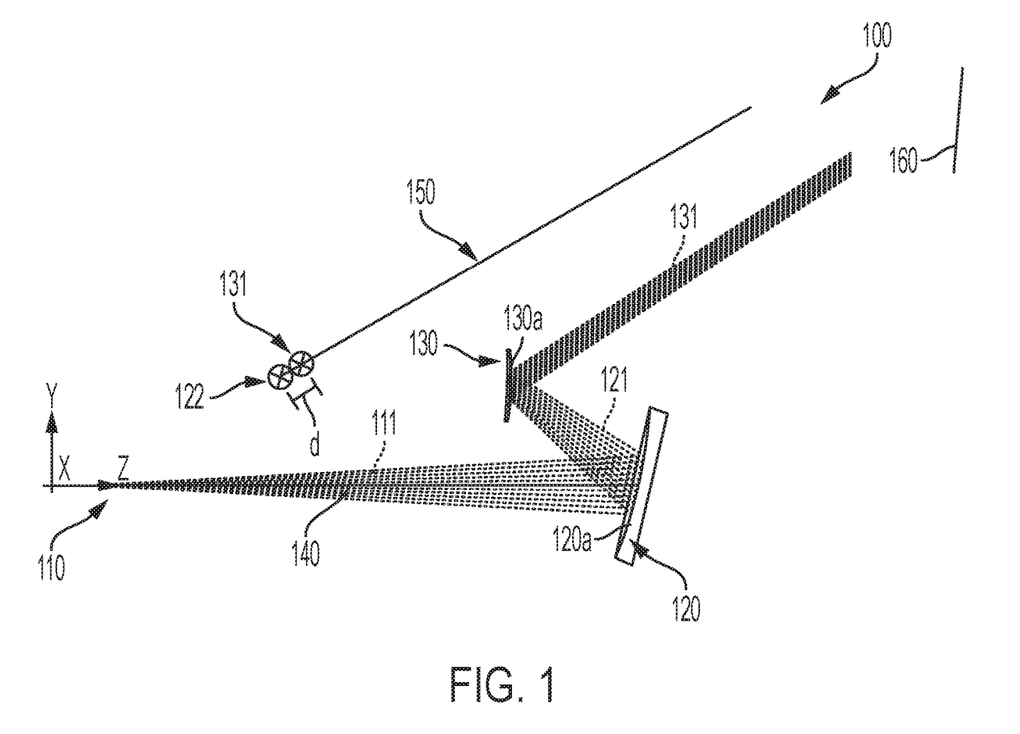
FIG. 1 schematically depicts an optical system according to embodiments disclosed and described herein.

With reference to FIG. 1, an optical system 100 according to embodiments will be described. The optical system 100 according to embodiments comprises an output source 110, a first optical component 120, and a second optical component 130. The output source 110 outputs an electromagnetic signal 111 (such as, for example, light) that travels along a system optical axis 140 to the first optical component 120. When the electromagnetic signal 111 contacts the first optical component 120, the path of the electromagnetic signal 111 is directed (such as, for example, through reflection, refraction, or the like) to the second optical component 130 as a directed electromagnetic signal 121. When the directed electromagnetic signal 121 contacts the second optical component 130, the directed electromagnetic signal 121 is redirected (such as, for example, through reflection, refraction, or the like) as redirected electromagnetic signal 131 to a final image focus 160. It should be understood that to direct the electromagnetic signal 111 emitted from the output source 110 to the final image focus 160, the first optical component 120 and the second optical component 130 are aligned with very tight tolerances. If the alignment of the first optical component 120 and the second optical component 130 are off by even fractions of a millimeter, the redirected electromagnetic signal 131 will not reach the final image focus 160.

The output source 110 may be any source that is capable of emitting an electromagnetic signal 111. In embodiments, the output source 110 may be an optical fiber, a light emitting diode, a laser or laser diode, a spatial light modulator such as a micro mirror array, liquid crystal device or organic light emitting diode array. The output source 110 emits an electromagnetic signal 111 that may be visible light, ultraviolet radiation, or infrared radiation as part of the optical system 100. As disclosed herein, the electromagnetic signal 111 travels along a system optical axis 140. The system optical axis 140, as depicted in FIG. 1, aligns with the center electromagnetic ray in the bundle of rays emitted from the output source 110 as the electromagnetic signal 111. As shown in FIG. 1, the output source 110 and the first optical component 120 are spaced apart along the system optical axis 140, and the electromagnetic signal 111 is transmitted from the output source 110 to the first optical component 120 along the system optical axis 140.

In embodiments, the first optical component 120 is spaced apart from the output source 110 along the system optical axis 140 such that the first optical component 120 receives the electromagnetic signal 111. However, it should be understood that although not depicted in FIG. 1, in embodiments, the first optical component 120 may not be positioned along the system optical axis 140. In embodiments, the first optical component 120 is a concave mirror or a convex mirror. In embodiments, the first component is the surface of a lens. Whether the first optical component 120 is a convex mirror or a concave mirror, as is depicted in FIG. 1, the first optical component 120 is aligned such that the electromagnetic signal 111 is received by the first optical component 120 and directed to the second optical component 130 as electromagnetic signal 121. The first optical component 120 may be aligned in this manner by tilting the first optical component 120 about an axis of rotation in such a way that the first optical component 120 is capable of both receiving the electromagnetic signal 111 from the output source 110 and directing the focused electromagnetic signal 121 to the second optical component 130. The first optical component 120 will have a center of curvature 122 that is defined by the curvature of the concave or convex portion of the first optical component 120. For example, the center of curvature 122 depicted in FIG. 1 is a center of curvature defined by the curvature of the concave portion 120a of the first optical component 120.

In embodiments, the second optical component 130 is positioned such that it receives the electromagnetic signal 121 from the first optical component 120 and transmits or reflects redirected electromagnetic signal 131 to the final image focus 160. The system optical axis 140 is directed by the first optical component 120 towards the second optical component 130 and is then redirected towards the image 160. In this way, there is a system optical axis 140 that intersects both components. In embodiments, the second optical component 130 is a concave mirror or a convex mirror. In other embodiments the second optical component 130 is a lens. In embodiments depicted in FIG. 1, the second optical component 130 is a convex mirror. Whether the second optical component 130 is a concave mirror or a convex mirror, as is depicted in FIG. 1, the second optical component 130 is aligned such that the electromagnetic signal 121 is received by the second optical component 130 and focused to the final image focus 160 as redirected electromagnetic signal 131. The second optical component 130 may be aligned in this manner by tilting the second optical component 130 about an axis of rotation in such a way that the second optical component 130 is capable of both receiving the electromagnetic signal 121 from the first optical component 120 and redirecting the redirected electromagnetic signal 131 to the final image focus 160. The second optical component 130 will have a center of curvature 132 that is defined by the curvature of the concave or convex portion 130a of the second optical component 130. For example, the center of curvature 132 depicted in FIG. 1 is a center of curvature defined by the curvature of the convex portion 130a of the second optical component 130.

The center of curvature 122 of the first optical component 120 and the center of curvature 132 of the second optical component define the optical axis of symmetry 150. In embodiments, the optical axis of symmetry 150 is defined as a line that passes through the center of curvature 122 of the first optical component 120 and the center of curvature 132 of the second optical component 130. The relationship between the optical axis of symmetry 150 and the system optical axis 140 (such as, for example, an angle defined by the system optical axis 140 and the optical axis of symmetry 150) is determined by the predetermined design of the optical system 100. As used herein, a "predetermined" element, such as, for example, a predetermined center of curvature, a predetermined position of an optical elements, and the like, are "predetermined" based upon the design of the optical system. It should be understood that optical systems might be designed by a person of ordinary skill in the art to meet certain design criteria. Accordingly, in embodiments, the center of curvature 122 of the first optical component 120 and the center of curvature 132 of the second optical component 130 are positioned such that a line that intersects the center of curvature 122 of the first optical component 120 and the center of curvature 132 of the second optical component 130 becomes the optical axis of symmetry 150, and the system optical axis 140 is positioned relative to the optical axis of symmetry 150, such as by positioning the system optical axis 140 at a predetermined angle relative to the optical axis of symmetry 150.

As shown in the embodiments depicted in FIG. 1, the center of curvature 122 of the first optical component 120 and the center of curvature 132 of the second optical component 130 are separated by a distance d, which is predetermined by the desired design of the optical system 100, along the optical axis of symmetry 150, which intersects both the center of curvature 122 of the first optical component 120 and the center of curvature 132 of the second optical component 130. To properly align the first optical component 120 and the second optical component 130—and thereby obtain a properly functioning optical system 100—the center of curvature 122 of the first optical component 120 and the center of curvature 132 of the second optical component 130 must be placed with precision along the optical axis of symmetry 150 and with a distance d separating the center of curvature 122 of the first optical component 120 and the center of curvature 132 of the second optical component 130.

Figure 2:
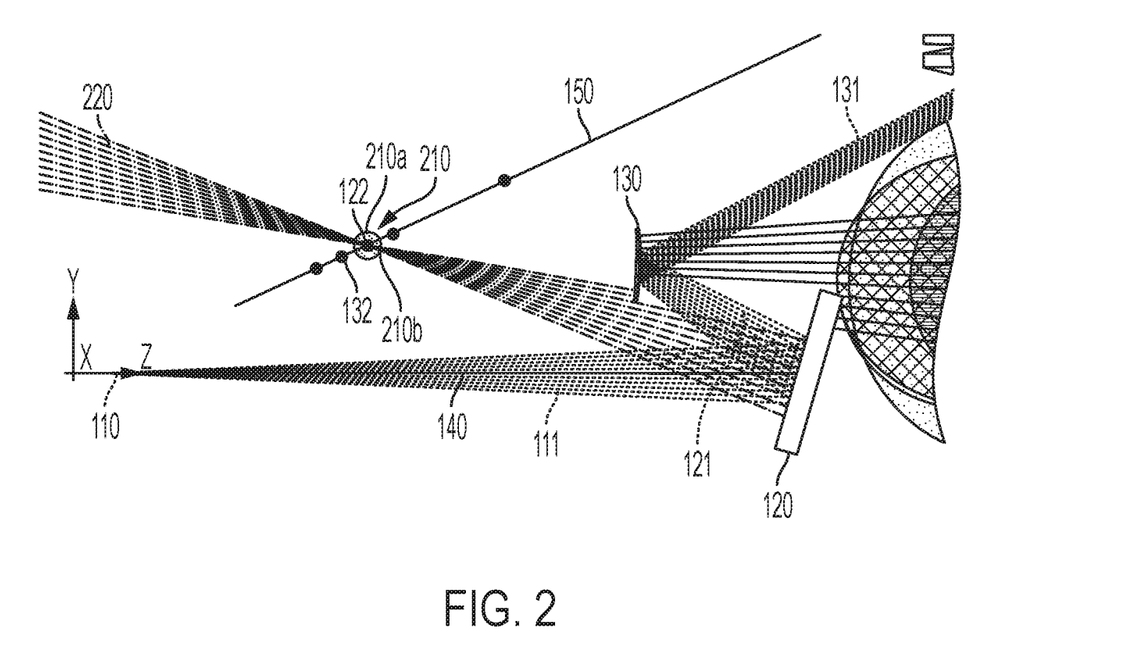
FIG. 2 schematically depicts a method for aligning optical components with one sphere according to embodiments disclosed and described herein.
Figure 3:
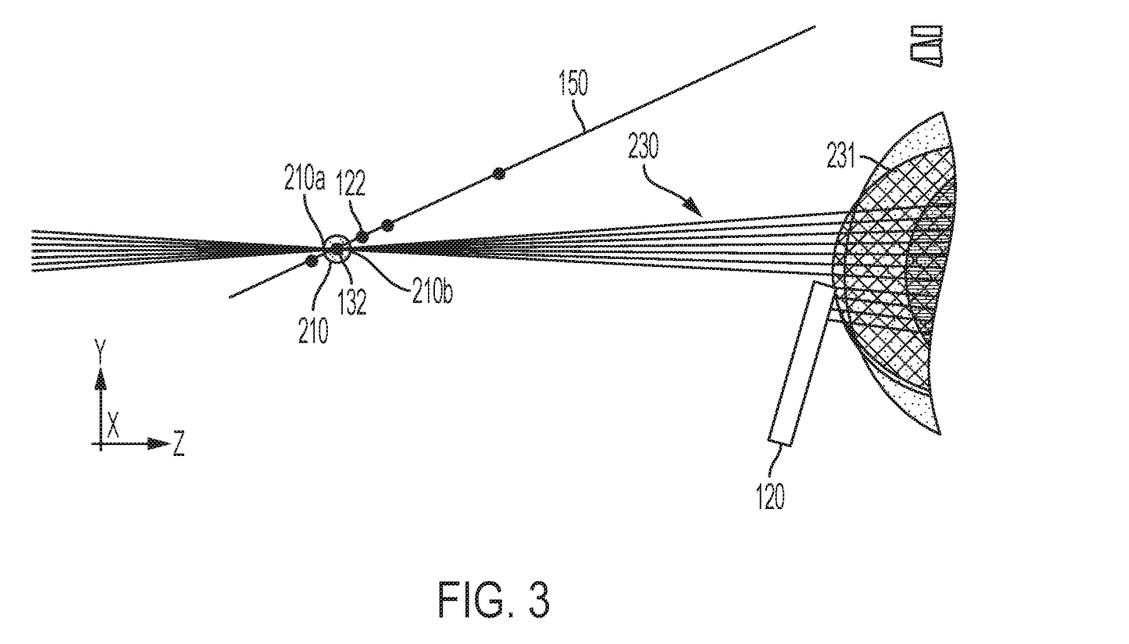
FIG. 3 schematically depicts a method for aligning optical components with one sphere and reference signals according to embodiments disclosed and described herein.
Figure 4:
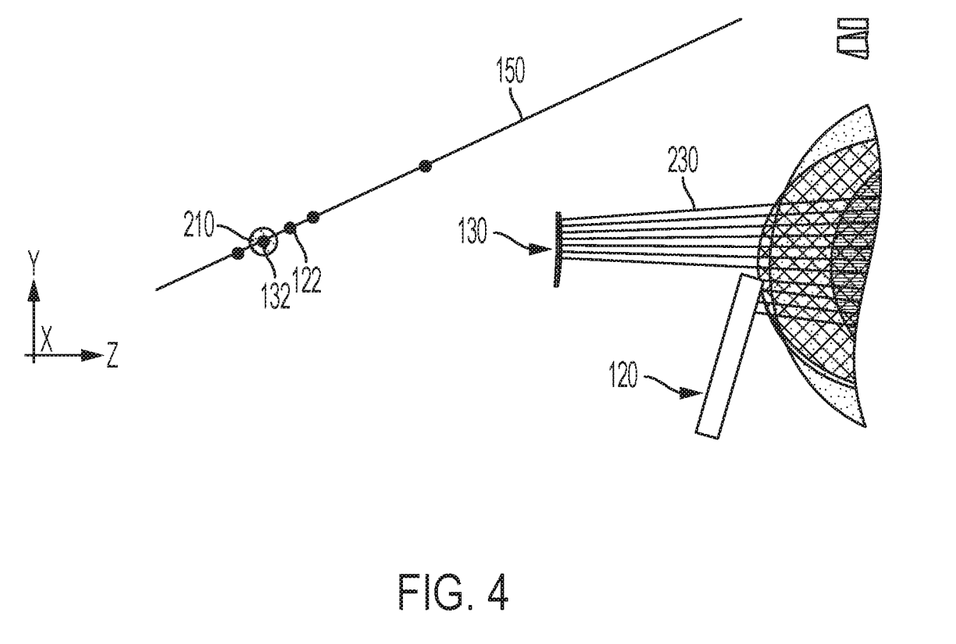
FIG. 4 schematically depicts a method for aligning optical components with one sphere, reference signals, and components according to embodiments disclosed and described herein.

With reference now to FIG. 2-FIG. 4, methods for aligning optical components of an optical system according to embodiments using a single sphere will be described. As shown in FIG. 2 a sphere 210 is positioned in a first position on the optical axis of symmetry 150 such that the geometrical center of the sphere 210 is at the desired center of curvature 122 of the first optical component 120. Once the sphere 210 is in the first position on the axis of symmetry 150 such that the geometrical center of the sphere 210 is at the desired location of center of curvature 122 of the first optical component 120, a first reference signal 220 is focused to the geometrical center of the sphere 210. The first reference signal 220 strikes the sphere 210, and is focused at the geometrical center of the sphere—that coincides with the desired location of center of curvature 122 of the first optical component 120. In embodiments, the sphere is made from a transparent material such as glass, and in this case the light can propagate towards the first optical component 120. In embodiments, the sphere can be made from an opaque material such as stainless steel and in this case, the ball must be removed before the light can propagate to the first optical component 120. In embodiments, the first reference signal 220 is lasers of an interferometer (not shown) or the source of a point source microscope (not shown).

In embodiments where the first reference signal 220 is lasers of an interferometer, the first reference signal 220 is focused to the geometrical center of the sphere 210. The light that is reflected off the surface of the sphere 210 is interfered with the reference arm of the interferometer. In the case where the sphere 210 is made from a transparent material, the interfering reference arm of the interferometer could be the second surface of the sphere 210 that the light hits. In the case where the sphere 210 is made from an opaque material, the reflected light from the surface of the sphere 210 is combined in the interferometer with a reference beam. When the interference fringes from the reflection of the surface of the sphere 210 and the reference arm of the interferometer are nulled out, the interferometer is focused to the geometrical center of the sphere 210.

In embodiments where the first reference signal 220 is a source from a point source microscope, the source may be focused to the geometrical center of the sphere 210 by methods disclosed in U.S. Pat. No. 6,924,897, which is incorporated herein by reference in its entirety.

After the first reference signal 220 has been focused to the geometrical center of the sphere 210, the source of the first reference signal 220 (such as, for example, the interferometer or point source microscope, which are not depicted in FIG. 2) is fixed in place by mechanical or chemical mechanisms such as, for example, screws, bolts, adhesives and the like. Subsequently, in embodiments, the first optical component 120 is aligned with the first reference signal 220 by tilting or decentering the first optical component 120 about an axis Exemplary ways to align the first optical component 120 with the first reference signal may be found in U.S. Pat. No. 5,541,731, which is incorporated herein by reference in its entirety, for embodiments using an interferometer to generate the first reference signal 220, and may be found in U.S. Pat. No. 6,924,897 for embodiments using a point source microscope to generate the first reference signal 220. Once the first optical component 120 is aligned with the first reference signal 220, in embodiments, the first optical component 120 is fixed into position using mechanical or chemical mechanisms such as, for example, screws, bolts, adhesives and the like. It should be understood that in embodiments, the first optical component 120 may be aligned to the first reference signal 220 and fixed into position after both the first reference signal 220 and the second reference signal 230 have been positioned.

With reference now to FIG. 3, and according to embodiments, after the first optical component 120 is aligned with the first reference signal 220 and fixed in place, the sphere 210 is moved along the optical axis of symmetry 150 a distance d (shown in FIG. 1) from the center of curvature 122 of the first optical component 120 to a second position where the geometrical center of the sphere 210 is at the desired center of curvature 132 of the second optical component 130.

Figure 9:
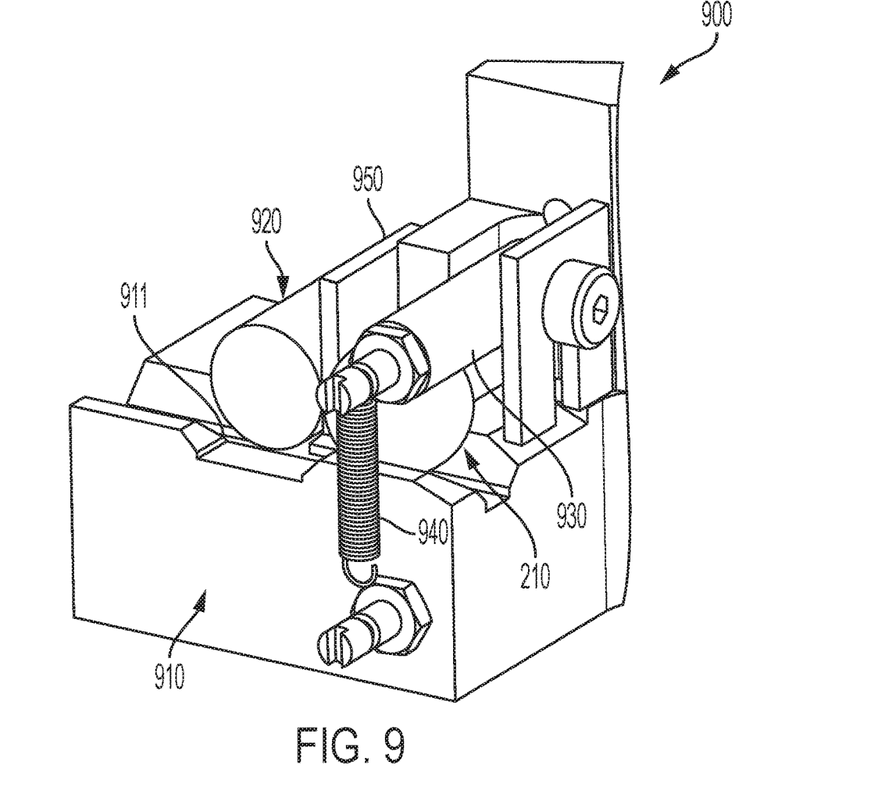
FIG. 9 schematically depicts a structure for moving a sphere along an optical axis of symmetry according to embodiments disclosed and described herein.

With reference now to FIG. 9, embodiments of a mechanism 900 for moving a sphere 210 along the optical axis of symmetry 150 will be described. The mechanism 900 comprises: a block 910 comprising a channel 911 in which the sphere 210 rests; a fixed reference component 920 that is immobile and dictates the initial position of the sphere 210 within the mechanism 900; and a retaining component 930 that is mobile and moves with the sphere 210 as it is translated along the channel 911 within the block 910. It should be understood that although the channel 911 depicted in FIG. 9 is a v-groove, the channel 911 can be of any shape suitable for translating the sphere 210 within the block 910. The retaining component 930 may, in embodiments, be attached to the block 910 by an elastic attachment member 940 that allows the retaining component 930 to move with the sphere 210 while maintaining a force on the sphere 210 in a direction toward the fixed reference component 920. This force allows for precise movement of the sphere 210 within the channel 911, and keeps the sphere 210 from being unintentionally displaced from the channel 911. In the embodiment depicted in FIG. 9, the elastic attachment member 940 is a spring; however, it should be understood that in embodiments, the elastic attachment member 940 may be any elastic member, such as, for example, a band made from elastic material.

Initially, and according to embodiments, the sphere 210 is positioned within the channel 911 in the block 910 such that the sphere 210 is positioned directly against and the fixed reference component 920 and kept in position by the retaining component 930. The mechanism 900 is then place on the optical axis of symmetry 150 such that the geometrical center of the sphere 210 is at the center of curvature 122 of the first optical component 120, and such that the channel 911 runs parallel to the optical axis of symmetry 150. From this position, the first reference signal 220 may be focused on the geometrical center of the sphere 210 and fixed into position, as described above. Once the first reference signal 220 is fixed into position, a spacer 950 having the thickness of d may, in embodiments, be placed between the sphere 210 and the fixed reference component 920 so that the sphere 210 is translated along the channel 911—and thus along the optical axis of symmetry 150—by a predetermined distance d. As the sphere 210 is translated along the channel 911, the retaining component 930 moves with the sphere 210 and applies a force on the sphere 210 in the direction of the fixed reference component 920, which keeps the sphere 210 in place within the channel 911 and allows for precision movement of the sphere 210 within the channel 911. Once the spacer 950 is in position, the sphere 210 is located at a second position such that the geometrical center of the sphere 210 is at a position that corresponds with the center of curvature 132 of the second optical component 130.

Once the sphere 210 is in the second position on the optical axis of symmetry 150 such that the geometrical center of the sphere 210 is at the desired location of center of curvature 132 of the second optical component 130, a second reference signal 230 is focused to the geometrical center of the sphere 210. The second reference signal 230 strikes the sphere 210, and is focused at the geometrical center of the sphere—that coincides with the desired location of center of curvature 132 of the second optical component 130. As disclosed above, the sphere 210 may be made from transparent material, such as, for example, glass, or opaque material, such as, for example, stainless steel. In embodiments, the second reference signal 230 is lasers of an interferometer (not shown) or the source of a point source microscope (not shown).

In embodiments where the second reference signal 230 is lasers of an interferometer, the second reference signal 230 is focused to the geometrical center of the sphere 210. The light that is reflected off the surface of the sphere 210 is interfered with the reference arm of the interferometer. In the case where the sphere 210 is made from a transparent material, the interfering reference arm of the interferometer could be the second surface of the sphere that the light hits.

In the case where the sphere 210 is made from an opaque material, the reflected light from the surface of the sphere 210 is combined in the interferometer with a reference beam. When the interference fringes from the reflection of the surface of the sphere 210 and the reference arm of the interferometer are nulled out, the interferometer is focused to the geometrical center of the sphere 210.

In embodiments where the second reference signal 230 is a source from a point source microscope, the source may be focused to the geometrical center of the sphere 210 by methods disclosed in U.S. Pat. No. 6,924,897.

After the second reference signal 230 has been focused to the geometrical center of the sphere 210, the source of the second reference signal 231 (such as, for example, the interferometer or point source microscope) is fixed in place by mechanical or chemical mechanisms such as, for example, screws, bolts, adhesives and the like. Subsequently, in embodiments and with reference to FIG. 4, the second optical component 130 is aligned with the second reference signal 230 by tilting or decentering the second optical component 130 about an axis. Exemplary ways to align the second optical component 130 with the second reference signal 230 may be found in U.S. Pat. No. 5,541,731 for embodiments using an interferometer to generate the second reference signal 230, and may be found in U.S. Pat. No. 6,924,897 for embodiments using a point source microscope to generate the second reference signal 230. Once the second optical component 130 is aligned with the second reference signal 230, in embodiments, the second optical component 130 is fixed into position using mechanical or chemical mechanisms such as, for example, screws, bolts, adhesives and the like. As disclosed above, in embodiments, the first optical component 120 may be aligned and fixed into position after the first reference signal 220 and the second reference signal 230 are placed, such as before or after the second optical component 130 is fixed into position. Subsequently, the first reference signal 220 and the second reference signal 230 may be removed and the optical system 100 as shown in FIG. 1 will be properly aligned.

Figure 5:
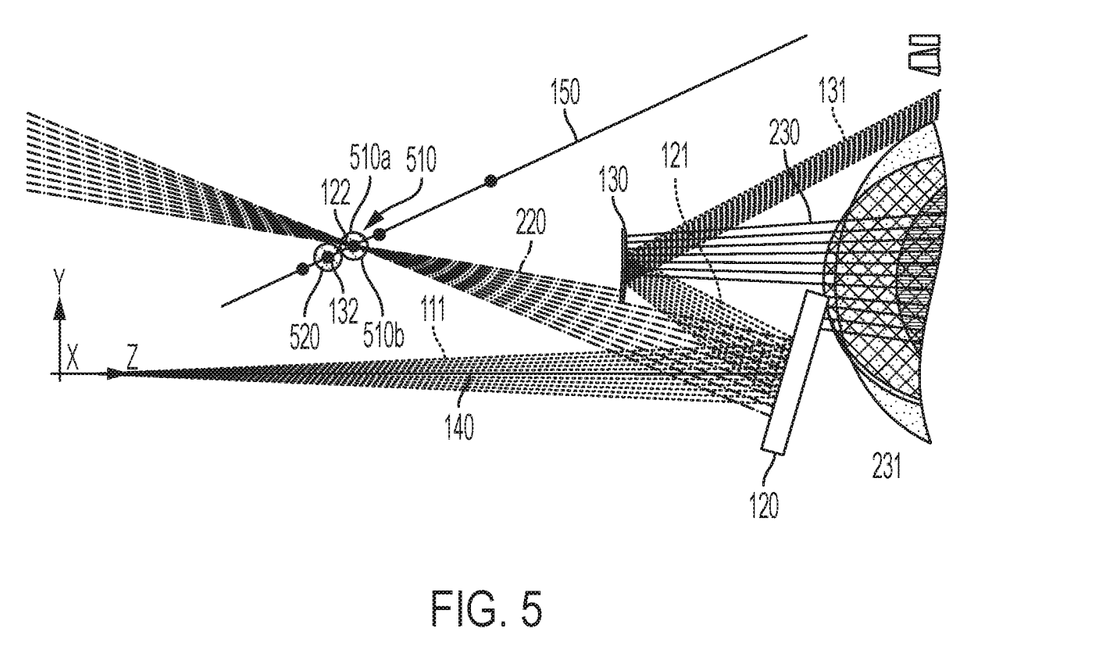
FIG. 5 schematically depicts a method for aligning optical components with two spheres according to embodiments disclosed and described herein.
Figure 6:
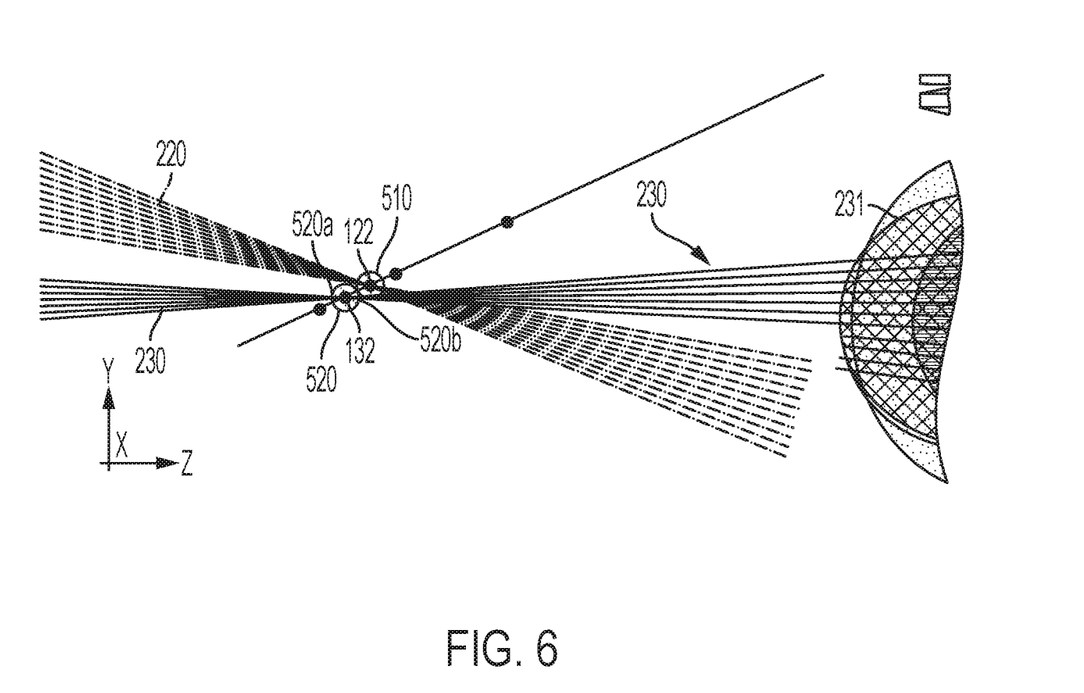
FIG. 6 schematically depicts a method for aligning optical components with two spheres and reference signals according to embodiments disclosed and described herein.
Figure 7:
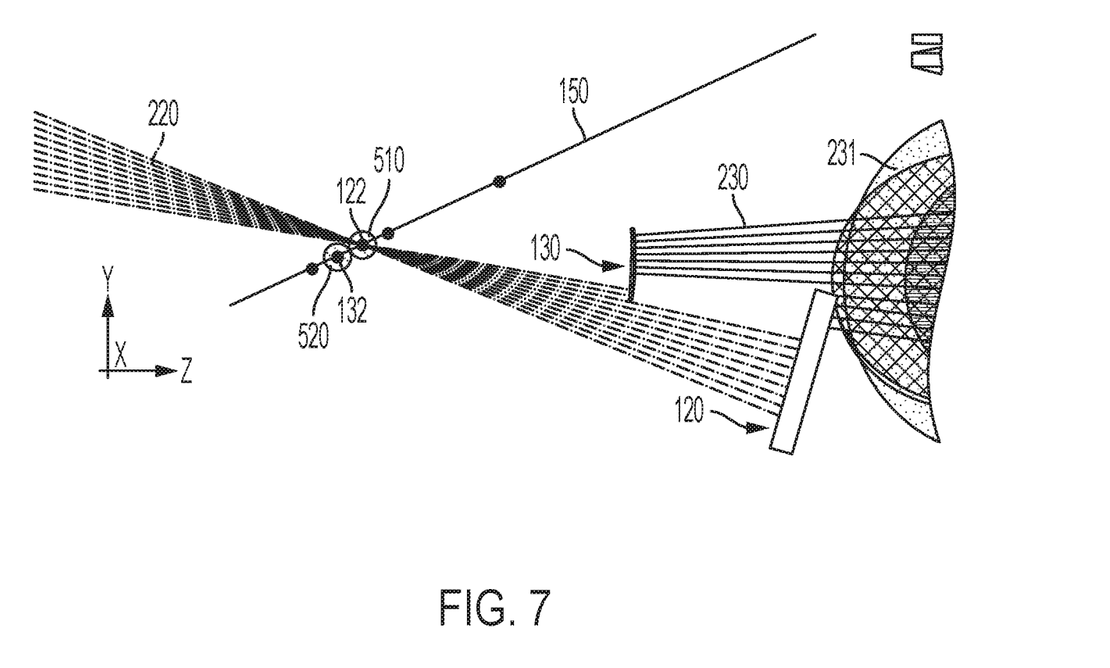
FIG. 7 schematically depicts a method for aligning optical components with two spheres, reference signals, and components according to embodiments disclosed and described herein.

With reference now to FIG. 5-FIG. 7, methods for aligning optical components of an optical system 100 according to embodiments using two spheres will be described. As shown in FIG. 5 a first sphere 510 is positioned in a first position on the optical axis of symmetry 150 such that the geometrical center of the first sphere 510 is at the center of curvature 122 of the first optical component 120. Once the first sphere 510 is in the first position on the axis of symmetry 150 such that the geometrical center of the first sphere 510 is at the desired location of center of curvature 122 of the first optical component 120, a first reference signal 220 is focused to the geometrical center of the first sphere 510. The first reference signal 220 strikes the first sphere 510, and is focused at the geometrical center of the first sphere 510—that coincides with the desired location of center of curvature 122 of the first optical component 120. The first sphere 510 may be made from transparent material, such as, for example, glass, or opaque material, such as, for example, stainless steel. In embodiments, the first reference signal 220 is lasers of an interferometer (not shown) or the source of a point source microscope (not shown).

In embodiments where the first reference signal 220 is lasers of an interferometer, the first reference signal 220 is focused to the geometrical center of the first sphere 510. The light that is reflected off the surface of the first sphere 510 is interfered with the reference arm of the interferometer. In the case where the first sphere 510 is made from a transparent material, the interfering reference arm of the interferometer could be the second surface of the first sphere 510 that the light hits. In the case where the first sphere 510 is made from an opaque material, the reflected light from the surface of the first sphere 510 is combined in the interferometer with a reference beam. When the interference fringes from the reflection of the surface of the first sphere 510 and the reference arm of the interferometer are nulled out, the interferometer is focused to the geometrical center of the first sphere 510.

In embodiments where the first reference signal 220 is a source from a point source microscope, the source may be focused to the geometrical center of the first sphere 510 by methods disclosed in U.S. Pat. No. 6,924,897.

After the first reference signal 220 is focused to the geometrical center of the first sphere 510, the source of the first reference signal 220 (such as, for example, the interferometer or point source microscope, which are not depicted in FIG. 5) is fixed in place by mechanical or chemical mechanisms such as, for example, screws, bolts, adhesives and the like. Subsequently, in embodiments, the first optical component 120 is aligned with the first reference signal 220 by tilting the first optical component 120 about an axis of rotation. Exemplary ways to align the first optical component 120 with the first reference signal 220 may be found in U.S. Pat. No. 5,541,731 for embodiments using an interferometer to generate the first reference signal 220, and may be found in U.S. Pat. No. 6,924,897 for embodiments using a point source microscope to generate the first reference signal 220. Once the first optical component 120 is aligned with the first reference signal 220, in embodiments, the first optical component 120 is fixed into position using mechanical or chemical mechanisms such as, for example, screws, bolts, adhesives and the like. It should be understood that in embodiments, the first optical component might be fixed into position once the first reference signal 220 and the second reference signal 230 are both fixed into position.

With reference now to FIG. 6, and according to embodiments, before, after, or simultaneously to, the first optical component 120 being aligned with the first reference signal 220 and fixed in place, the geometrical center of a second sphere 520 is placed at a second position along the optical axis of symmetry 150 a distance d (shown in FIG. 1) from the center of curvature 122 of the first optical component 120 (and thereby a distance d from the geometrical center of the first sphere 510), where the geometrical center of the second sphere 520 is at the center of curvature 132 of the second optical component 130. Once the second sphere 520 is in the second position on the axis of symmetry 150 such that the geometrical center of the second sphere 520 is at the desired location of the center of curvature 132 of the second optical component 130, a second reference signal 230 is focused to the geometrical center of the second sphere 520. The second reference signal 230 strikes the second sphere 520, and is focused at the geometrical center of the sphere—that coincides with the desired location of center of curvature 132 of the second optical component 130. As disclosed above, the second sphere 520 may be made from transparent material, such as, for example, glass, or opaque material, such as, for example, stainless steel. In embodiments, the second reference signal 230 is lasers of an interferometer (not shown) or the source of a point source microscope (not shown).

In embodiments where the second reference signal 230 is lasers of an interferometer, the second reference signal 230 is focused to the geometrical center of the second sphere 520. The light that is reflected off the surface of the second sphere 520 is interfered with the reference arm of the interferometer. In the case where the second sphere 520 is made from a transparent material, the interfering reference arm of the interferometer could be the second surface of the second sphere 520 that the light hits. In the case where the second sphere 520 is made from an opaque material, the reflected light from the surface of the second sphere 520 is combined in the interferometer with a reference beam. When the interference fringes from the reflection of the surface of the second sphere 520 and the reference arm of the interferometer are nulled out, the interferometer is focused to the geometrical center of the second sphere 520.

In embodiments where the second reference signal 230 is a source from a point source microscope, the source may be focused to the geometrical center of the second sphere 520 by methods disclosed in U.S. Pat. No. 6,924,897.

After the second reference signal 230 has been focused to the geometrical center of the second sphere 520, the source of the second reference signal 231 (such as, for example, the interferometer or point source microscope) is fixed in place by mechanical or chemical mechanisms such as, for example, screws, bolts, adhesives and the like. Subsequently, in embodiments and with reference to FIG. 7, the second optical component 130 is aligned with the second reference signal 230 by tilting the second optical component 130 about an axis of rotation. Exemplary ways to align the second optical component 130 with the second reference signal 230 may be found in U.S. Pat. No. 5,541,731 for embodiments using an interferometer to generate the second reference signal 230, and may be found in U.S. Pat. No. 6,924,897 for embodiments using a point source microscope to generate the second reference signal 230. Once the second optical component 130 is aligned with the second reference signal 230, in embodiments, the second optical component 130 is fixed into position using mechanical or chemical mechanisms such as, for example, screws, bolts, adhesives and the like. The first and second reference signals 220 and 230 may be removed and the optical system 100 as shown in FIG. 1 will be properly aligned.

It should be understood that in the embodiments described above using two spheres, the first optical component 120 and the second optical component 130 might be aligned to the first reference signal 220 and the second reference signal 230, respectively, at the same time or at different time. For example, the first optical component 120 may, in embodiments, be aligned to the first reference signal 220 and fixed in place and, subsequently, the second optical component 130 may be aligned to the second reference signal 230 and fixed in place or vice versa. In embodiments, the first optical component 120 may be aligned to the first reference signal 220 and fixed in place at essentially the same time that the second optical component 130 is aligned to the second reference signal 230 and fixed in place.

As shown in FIG. 5-FIG. 7, in embodiments, the first sphere 510 and the second sphere 520 are in physical contact with one another while the geometrical center of the first sphere 510 and the geometrical center of the second sphere 520 are present on the optical axis of symmetry 150. This physical contact between the first sphere 510 and the second sphere 520 allows for simple and precise positioning of the center of curvature 122 for the first optical component 120 and the center of curvature 132 of the second optical component 130. In embodiments, the sum of the radius of the first sphere 510 and the radius of the second sphere 520 is equal to the distance d prescribed as the distance along the optical axis of symmetry 150 between the center of curvature 122 of the first optical component 120 and the center of curvature 132 of the second optical component 130. Thereby, by physically contacting the first sphere 510 and the second sphere 520, the distance between the geometrical center of the first sphere 510—that coincides with the center of curvature 122 of the first optical component 120—and the geometrical center of the second sphere 520—that coincides with the center of curvature 132 of the second optical component 130—will be separated by a distance d along the optical axis of symmetry 150. In embodiments, the radius of the first sphere 510 and the radius of the second sphere may be different. In embodiments, the radius of the first sphere 510 and the second sphere 520 may be the same. In embodiments where the radius of the first sphere 510 and the second sphere 520 are the same, it should be understood that the diameter of the first sphere 510 and the diameter of the second sphere 520 are equal to the length of the distance d.

By using embodiments for aligning optical components disclosed and described herein, the optical components can be aligned within very tight tolerances. For instance, in embodiments, the spheres can be formed with less than a micrometer variance in desired diameter and the fringes of the interferometer are within a micrometer of tolerance. Accordingly, very precise alignment of the optical components can be achieved.

As presented above, the first sphere 510 and the second sphere 520 are placed along the optical axis of symmetry 150, and the geometrical centers of the first sphere 510 and the second sphere 520 represent the center of curvature 122 of the first optical component and the center of curvature 132 of the second optical component 120. The optical axis of symmetry 150 is represented by a line that intersects the center of curvature 122 of the first optical component 120 and the center of curvature 132 of the second optical component 120. The system optical axis 140 may then be established based on the design of the optical system 100 and the optical axis of symmetry 150, such as by a predetermined angle defined by the system optical axis 140 and the optical axis of symmetry 150. The first optical component 120 and the second optical component 130 can then be place into their respective positions as described above.

Figure 8:
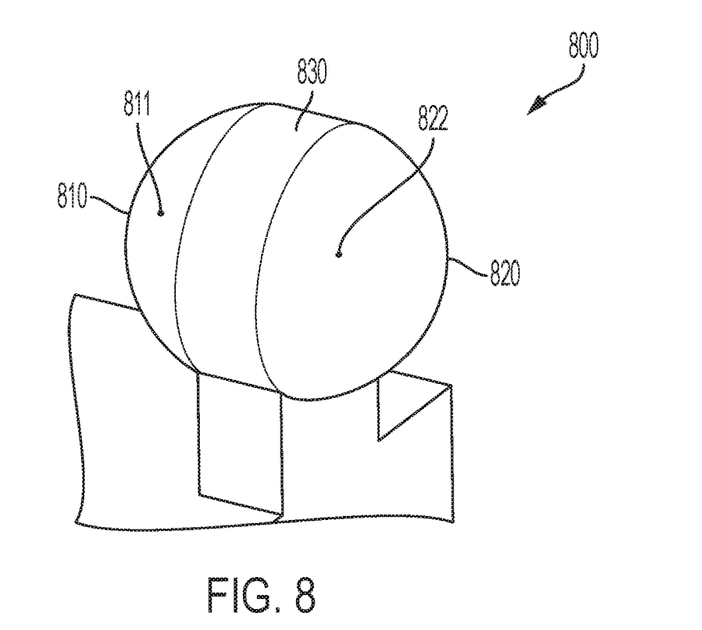
FIG. 8 schematically depicts an oblong structure for aligning optical components with two spheres, reference signals, and components according to embodiments disclosed and described herein.

According to embodiments, an oblong structure that is representative of the combination of the first sphere 510 and the second sphere 520 may be used in place of the first sphere 510 and the second sphere 520. For example, in embodiments, an oblong structure as shown in FIG. 8 may be used in place of the first sphere 510 and the second sphere 520. The oblong structure 800 according to embodiments has a first curved end 810, a second curved end 820, and an elongated portion 830 between the first curved end 810 and the second curved end 820. The first curved end 810 of the oblong structure 800 comprises a first center of curvature 811, and the second curved end 820 of the oblong structure 800 comprises a second center of curvature 821. The elongated portion 830 of the oblong structure 800 extends the first curved end 810 from the second curved end 820 such that the first center of curvature 811 and the second center of curvature 821 are separated by a distance d. Accordingly, the oblong structure 800 may be placed on the optical axis of symmetry 150 such that the first center of curvature 811 and the second center of curvature 821 are both present on the optical axis of symmetry 150 and separated by a distance d along the optical axis of symmetry 150.

Once the oblong structure 800 is in position on the axis of symmetry 150 such that the first center of curvature 811 and the second center of curvature 821 are at the desired location of the center of curvature 122 of the first optical component 120 and the center of curvature 132 of the second optical component 130, respectively, a first reference signal 220 is focused to first center of curvature 811 and a second reference signal 230 is focused to the second center of curvature 821. The first and second reference signals 220 and 230 strike the oblong structure 800, and are focused at the first center of curvature 811 and the second center of curvature 821—which coincide with the desired location of center of curvature 122 of the first optical component 120 and the center of curvature 132 of the second optical component 130. The oblong structure 800 may be made from transparent material, such as, for example, glass, or opaque material, such as, for example, stainless steel. In embodiments, the first and second reference signals 220 and 230 are lasers of an interferometer (not shown) or the source of a point source microscope (not shown).

In embodiments where the first and second reference signal 220 and 230 are lasers of an interferometer, the first and second reference signals 220 and 230 are focused to the first center of curvature 811 and the second center of curvature 821, respectively, of the oblong structure 800. The light that is reflected off the surface of the oblong structure 800 is interfered with the reference arm of the interferometer. In the case where the oblong structure 800 is made from a transparent material, the interfering reference arm of the interferometer could be the second surface of the oblong structure 800 that the light hits. In the case where the oblong structure 800 is made from an opaque material, the reflected light from the surface of the oblong structure 800 is combined in the interferometer with a reference beam. When the interference fringes from the reflection of the surface of the oblong structure 800 and the reference arm of the interferometer are nulled out, the interferometer is focused to the first center of curvature 811 and/or the second center of curvature 821 of the oblong structure 800.

In embodiments where the first reference signal 220 and/or the second reference signal 230 is a source from a point source microscope, the source may be focused to the first center of curvature 811 and/or the second center of curvature 821 of the oblong structure 800 by methods disclosed in U.S. Pat. No. 6,924,89.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for aligning multiple optical components in an optical system comprising:
   placing a sphere at a first position that is at a predetermined center of curvature of a first optical component;
   aligning a focus of a first reference signal with the sphere at the first position;
   moving the sphere along an axis of optical symmetry to a second position that is at a predetermined center of curvature of a second optical component;
   aligning a focus of a second reference signal with the sphere at the second position;
   aligning the first optical component with the first reference signal and fixing the first optical component; and
   aligning the second optical component with the second reference signal and fixing the second optical component.

2. The method of claim 1, wherein the first reference signal and the second reference signal are selected from lasers of an interferometer and a source of a point source microscope.

3. The method of claim 1, wherein the first reference signal and the second reference signal are lasers of an interferometer.

4. The method of claim 1, wherein the first optical component and the second optical component are mirrors.

5. The method of claim 1, wherein at least one of the first optical component and the second optical component is not present on a system optical axis.

6. The method of claim 5, wherein the first optical component is present on the system optical axis and the second optical component is not present on the system optical axis.

7. The method of claim 1, wherein the sphere is made of glass.

8. The method of claim 1, wherein the first optical component and the second optical component are fixed by adhering the first optical component and the second optical component with an adhesive.

9. A method for aligning multiple optical components in an optical system comprising:
   placing a first sphere at a center of curvature of a first optical component;
   placing a second sphere at a center of curvature of a second optical component and in physical contact with the first sphere;
   aligning a focus of a first reference signal to the first sphere;
   aligning a focus of a second reference signal to the second sphere;
   aligning the first optical component with the first reference signal and fixing the first optical component; and
   aligning the second optical component with the second reference signal and fixing the second optical component,
   wherein a sum of a radius of the first sphere and a radius of the second sphere is equal to a distance between the center of curvature of the first optical component and the center of curvature of the second optical component.

10. The method of claim 9, wherein the first reference signal and the second reference signal are selected from lasers of an interferometer and a source of a point of source microscope.

11. The method of claim 10, wherein the first reference signal and the second reference signal are lasers of an interferometer.

12. The method of claim 9, wherein the first optical component and the second optical component are mirrors.

13. The method of claim 9, wherein at least one of the first optical component and the second optical component are not present on a system optical axis.

14. The method of claim 13, wherein the first optical component is present on the system optical axis and the second optical component is not present on the system optical axis.

15. The method of claim 13, wherein the first optical component is present on the system optical axis and the second optical component is not present on the system optical axis.

16. The method of claim 9, wherein one of the first optical component or the second optical component is a convex mirror.

17. The method of claim 16, wherein one of the first optical component or the second optical component is a concave mirror.

18. The method of claim 9, wherein a diameter of the first sphere and a diameter of the second sphere is each equal to the distance between the center of curvature of the first optical component and the center of curvature of the second optical component.

19. The method of claim 9, wherein the first sphere and the second sphere are made of glass.

20. The method of claim 9, wherein a geometrical center of the first sphere and a geometrical center point of the second sphere are each present on an optical axis of symmetry.

* * * * *